US005866869A

United States Patent [19]

Schneider et al.

[11] Patent Number: 5,866,869

[45] Date of Patent: Feb. 2, 1999

[54] PLASMA PILOT ARC CONTROL

[75] Inventors: Joseph Schneider, Menasha; Stephen Li; Jon Reynolds, both of Appleton, all of Wis.

[73] Assignee: Illinois Tool Works Inc., Glenview, Ill.

[21] Appl. No.: 804,819

[22] Filed: Feb. 24, 1997

[51] Int. Cl.[6] .......... B23K 10/00

[52] U.S. Cl. .......... 219/121.39; 219/121.57; 219/121.44; 219/121.54

[58] Field of Search .......... 219/121.54, 121.57, 219/121.56, 121.39, 121.44, 75

[56] References Cited

U.S. PATENT DOCUMENTS

| | | | |
|---|---|---|---|
| 4,791,268 | 12/1988 | Sanders et al. . | |
| 4,902,871 | 2/1990 | Sanders et al. . | |
| 5,170,030 | 12/1992 | Solly et al. | 219/121.54 |
| 5,530,220 | 6/1996 | Tatham | 219/121.57 |
| 5,620,617 | 4/1997 | Borowy et al. | 219/121.54 |
| 5,630,952 | 5/1997 | Karino et al. | 219/121.57 |

*Primary Examiner*—Mark H. Paschall
*Attorney, Agent, or Firm*—George R. Corrigan

[57] ABSTRACT

A method and apparatus for controlling and maintaining a continuous flow of pilot arc current in a plasma cutting torch includes a pilot circuit, a current sensing circuit, and a control circuit. The control circuit maintains a continuous flow of pilot current through the pilot circuit both before and after a cutting arc has been generated. The control circuit further controls the magnitude of the pilot current in response to the sensing circuit indicating the absence or presence of the cutting arc.

33 Claims, 1 Drawing Sheet

100
106
SENSE
102
DC PWR SUPPLY
(+) W
114
108
(+) A
110
118
116
104
112
(–) E

PLASMA PILOT ARC CONTROL

BACKGROUND OF THE INVENTION

The present invention relates generally to the art of plasma cutting. More particularly, this invention relates to a method and apparatus for controlling the pilot arc current in a plasma cutting torch.

Many plasma cutting torches have a pilot circuit for initiating a plasma cutting arc which operates upon a workpiece. Pilot circuits require special circuitry and mechanical design to produce a pilot arc which can be transferred to the workpiece to form the cutting arc. A commonly used example of a special pilot circuit is a high voltage, high frequency (HVHF) circuit that starts the pilot arc by breaking down the gap between the torch electrode and anode with a high voltage pulse. The HVHF type pilot circuit, however, has the disadvantage of creating significant amounts of electromagnetic radiation that could interfere with or damage other electronics.

Another common method for starting the pilot arc, called contact starting, uses a specially designed torch and nozzle. An example of a contact start torch is described in U.S. Pat. No. 4,791,268, to N. Sanders, et al., and U.S. Pat. No. 4,902,871, to N. Sanders, et al., incorporated herein by reference. When an operator triggers the contact start torch, the pilot circuit generates the pilot arc between the electrode and the torch nozzle. An ionizable gas is directed through the arc, creating a plasma jet. The plasma torch then is brought near the workpiece to initiate the cutting arc. The plasma jet ionizes the gap between the torch and the workpiece, and the arc transfers, extending from the torch electrode to the workpiece.

In both HVHF and contact starting plasma cutting torches, the current flow in the pilot circuit can be either maintained or interrupted once the pilot arc is transferred to the workpiece. However, the continuous pilot current mode and the interrupted current mode each have disadvantages as well as advantages. For example, if the pilot circuit is kept active in a HVHF type torch, undesirable electromagnetic radiation is continuously generated. In a contact starting torch, maintaining pilot current flow results in excessive wear and tear on the torch nozzle. However, the continuous pilot current mode enables the plasma torch to generate a pilot arc immediately upon loss of the cutting arc, advantageously allowing the operator efficiently to cut broken or expanded metal. On the other hand, if the pilot current is interrupted, electromagnetic radiation from a HVHF torch is minimized and the consumable life of a contact start torch nozzle increases, but at the expense of losing the ability to revert quickly back to a pilot arc and cutting arc. An outage of the cutting arc creates a nuisance when working upon a piece having any type of openings.

One prior art plasma arc cutting power supply uses a mechanical relay in series with the pilot arc circuit. The relay is opened when the arc is cutting, and is closed when the process is being initiated. This mechanical relay includes a snubber circuit in parallel with the relay. The snubber circuit includes a capacitor in parallel with a resistor. The snubber circuit also includes a diode in parallel with another resistor. The resistor/diode combination is in series with the resistor/capacitor combination. The snubber resistors have a combined resistance of approximately 3400 ohms. The pilot arc circuit includes a resistor having a resistance of approximately 6 ohms in series with the relay/snubber circuit. Thus, a small pilot current may flow even when the relay is opened. However, the relatively high snubber resistance limits the current to a less than useful (for minimize arc outages) magnitude. The continuous pilot current will be on the order of 70 milliamps for a pilot current of 15 amps. Also, the mechanical relay cannot be closed fast enough to prevent or minimize arc outages. Indeed, this prior art plasma cutter requires HF to start and restart the arc.

Thus, there is a need for a plasma cutting torch that can prevent or minimize an outage of the cutting arc, that has an increased consumable life, and that does not produce significant amounts of electromagnetic radiation.

SUMMARY OF THE INVENTION

The present invention provides an improved method and apparatus for maintaining current flow in a plasma cutting torch pilot circuit, without detrimental effect to the consumable life of the torch nozzle and without producing significant amounts of electromagnetic radiation. Thus, in accordance with a first aspect of the invention, a method for controlling the pilot current in a plasma cutting torch is provided which maintains a continuous flow of pilot current to generate a pilot arc. The pilot arc is transferred to initiate the cutting arc. The magnitude of the pilot current is then controlled in response to sensing a cutting current indicative of the cutting arc.

In accordance with another aspect of the invention, an apparatus having a pilot circuit, a sensing circuit, and a control circuit controls the pilot current in a plasma cutting torch. The pilot circuit maintains a continuous flow of pilot current and generates the pilot arc, which is transferred to initiate the cutting arc. The sensing circuit detects and provides an output indicative of a cutting arc current. The control circuit controls the magnitude of the pilot current in response to the sensing circuit output.

In accordance with a further aspect of the invention, an apparatus for controlling the pilot current in a plasma cutting torch comprises power supply means, pilot means, cutting arc means, sensing means, and control means. The pilot means, which is coupled to the power supply means, maintains a continuous flow of pilot current and generates the pilot arc. The cutting arc means transfers the pilot arc to initiate the cutting arc. The sensing means detects a cutting arc current and provides an output indicative thereof. The control means, which is coupled to the sensing means, controls the magnitude of the pilot current in response to the sensing means output.

In accordance with still a further aspect of the invention, a pilot arc circuit having an anode and an electrode, includes a sensing circuit and a current control circuit. Pilot arc current flowing through the pilot arc circuit initiates a pilot arc between the anode and the electrode. The sensing circuit detects the condition of the pilot arc and provides an output indicative thereof. The current control circuit, which is coupled to the sensing circuit, provides a continuous flow of pilot arc current and regulates the magnitude of the pilot arc current in response to the output of the sensing circuit.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

For purposes of illustrating the preferred exemplary embodiment, operation of a contact start plasma cutting torch will be discussed. It should be understood, however, that other embodiments may incorporate other types of plasma cutting torches, such as a HVHF type torch, without departing from the spirit or scope of the claimed invention.

Figure 1:
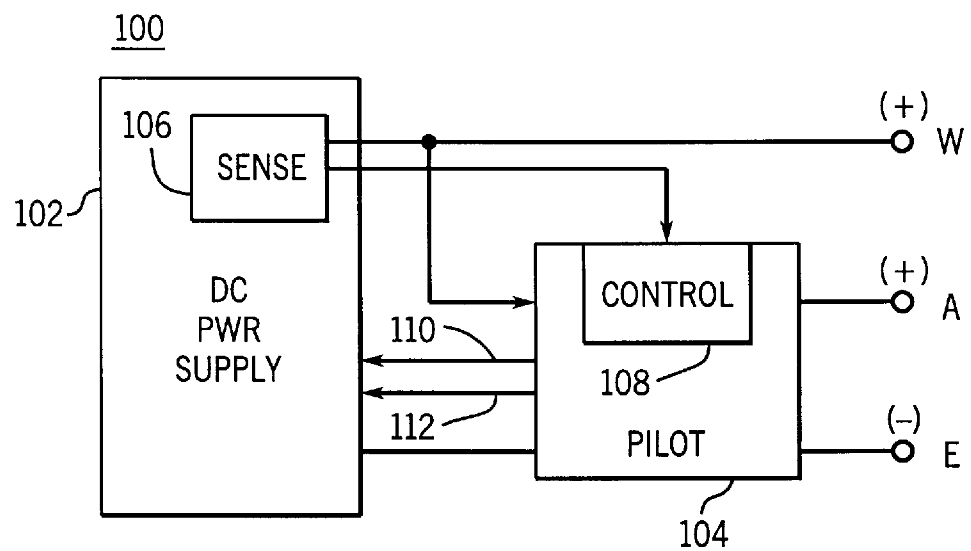
FIG. 1 is a block diagram of an exemplary embodiment in accordance with the invention.

Turning now to FIG. 1, a block diagram of an exemplary embodiment of a plasma cutting torch with pilot arc current control is illustrated. A plasma cutting torch 100 includes a DC power supply 102, a pilot circuit 104, a sensing circuit 106, and a control circuit 108. Torch 100 also includes an anode A, an electrode E, and an output W. The pilot arc is generated between anode A and electrode E. The cutting arc flows between electrode E and a workpiece which is coupled to output W.

DC power supply 102 may be any type of DC power source well known in the art capable of providing sufficient power to initiate and maintain the pilot and cutting arcs. In addition, DC power supply 102 may include logic and control circuitry for interrupting or starting operation of torch 100 as well as for manually selecting various operating parameters, such as the magnitude of the cutting arc current.

To provide power for the pilot arc in a contact start torch, current flows out of DC power supply 102, through pilot circuit 104 and the body of torch 100, and returns to DC power supply 102 through the lead of torch electrode E. During this mode of operation, electrode E and anode A are in electrical contact. The magnitude of the pilot current is controlled by feedback signals 110 and 112 which are electrically coupled to DC power supply 102.

After current is flowing, a jet of ionizable gas forces electrode E and anode A apart, thus generating a pilot arc between electrode E and anode A. The ionizable gas flows around the pilot arc, forming a plasma jet. During this mode of operation, called the nontransferred pilot arc mode, the pilot current flows across the arc, and the magnitude of the pilot current continues to be controlled by feedback signals 110 and 112 provided to DC power supply 102.

Torch 100 can then be brought in proximity to a workpiece to initiate the cutting arc. The plasma jet ionizes the gas between the workpiece and the torch, creating a current path. The pilot arc transfers, thus generating the cutting arc between electrode E and the workpiece coupled to output W. This mode of operation is called the transferred mode. Current flows from DC power supply 102, through output W, across the cutting arc, and returns to DC power supply 102 through the lead of electrode E.

Once the pilot arc has been transferred to the workpiece, the current flowing through the pilot circuit can be either maintained or terminated. As discussed above, maintaining current flow can be undesirable because of wear to anode A. Thus, prior art plasma cutting torches would terminate current flow by opening a switch coupled in series with the anode. This switch would then be closed upon detection of a cutting arc outage. Although this method decreases the wear to the anode, the series switch is subjected to a significant amount of electrical stress in breaking the pilot circuit. Breaking the circuit creates large voltage spikes across the series switch due to the large magnitude of pilot current flow. In addition, the time taken to close the series switch and start a current flow produces an undesirable delay in restarting the pilot and cutting arcs. Thus, the most desirable operating condition during the transferred mode would be one in which a reduced magnitude of pilot current continues to flow in pilot circuit 104. This is the approach taken by the present invention.

Referring still to FIG. 1, sensing circuit 106 is coupled in series with output W, such that sensing circuit 106 can detect a current flow indicative of the presence of the cutting arc. An output from sensing circuit 106, which is coupled to control circuit 108 included in pilot circuit 104, provides an indication of the cutting arc current flow. If the cutting arc current exceeds a predetermined threshold (indicative of the presence of the cutting arc), control circuit 108 reduces, but does not terminate, the flow of pilot arc current through pilot circuit 104. In the preferred embodiment, the threshold is about 17 amps and the reduced pilot current is several amps or lower, for example on the order of over one hundred milliamperes, when the cutting arc is present.

Conversely, when sensing circuit 106 detects that the cutting arc current has fallen below a predetermined minimum threshold (10A in the preferred embodiment), which indicates a cutting arc outage, control circuit 108 increases the magnitude of the flow of pilot current (to approximately 15 amps in the preferred embodiment) through pilot circuit 104. The pilot arc can then be initiated and transferred to restart the cutting arc.

Maintaining a decreased amount of current flow through pilot circuit 104 during the transferred pilot mode provides several advantages. For example, the decreased current magnitude increases the consumable life of the plasma cutting torch by decreasing the wear to the nozzle which would otherwise occur if a large magnitude of current were maintained. In addition, maintaining some amount of current flow enables the pilot circuit to more quickly initiate the pilot arc. Also, the continuous current flow through pilot circuit 104 has a snubbing effect on voltage spikes that would otherwise be generated across switching elements if current flow were interrupted. Additionally, the cutting current is greater, by an amount equal to the maintained pilot current.

Figure 2:
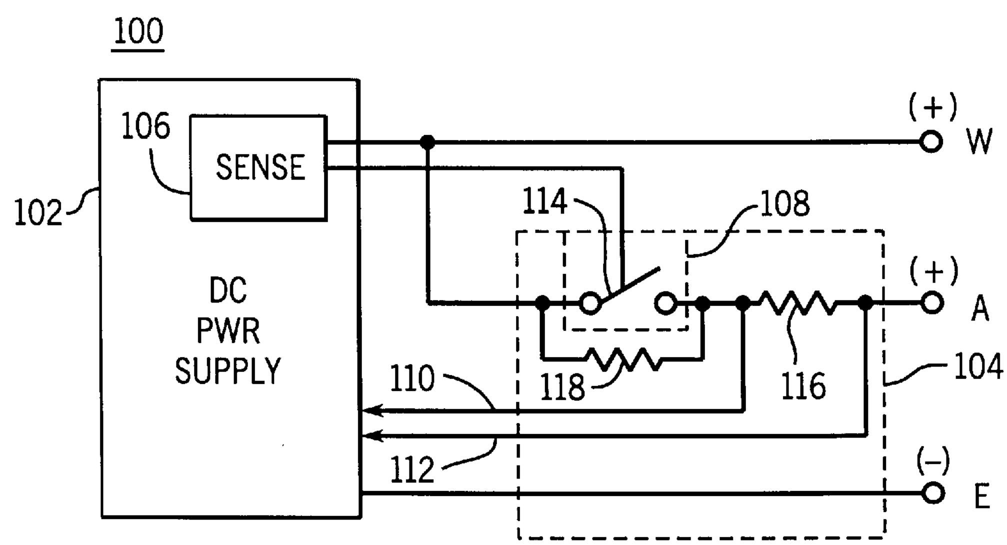
FIG. 2 is an exemplary schematic drawing of the block diagram depicted in FIG. 1.

Referring now to FIG. 2, a schematic illustration of relevant portions of a preferred embodiment of the plasma cutting torch having pilot current control is shown. In the nontransferred pilot arc mode, current flows from DC power supply 102, through a fast switch 114 in control circuit 108, through a resistor 116, across the gap between anode A and electrode E, and returns to DC power supply 102 through the lead of electrode E. In the preferred embodiment, switch 114 is an IGBT having a switching speed in the nanosecond range, for example about 25 ns on, and 190 ns off in one embodiment. However, in alternative embodiments, switch 114 could be a MOSFET or any other type of switching element capable of quickly switching the requisite magnitude of pilot current.

After the pilot arc has been formed, the cutting arc then can be generated by bringing the torch in proximity to a workpiece. When sensing circuit 106 detects the presence of a current indicative of the cutting arc, switch 114 in control circuit 108 is opened. In the preferred embodiment, sensing circuit 106 is part of the regulator of the dc power supply. The current regulator, including current sensor 106, may detect the cutting current and/or the pilot current. One alternative embodiment has current sensor 106 comprised by a weld current sensing relay. It should be understood, however, that sensing circuit 106 can comprise other types of current sensing circuitry, such as are well known in the art. Additionally, voltage could be sensed rather than current.

Upon opening switch 114 in the transferred pilot arc mode, the current in pilot circuit 104 flows from DC power supply 102, through resistors 118 and 116 and the body of torch 100, and returns to DC power supply 102 through the lead of electrode E. The addition of resistor 118 in series with resistor 116 increases the impedance of the pilot current path such that the magnitude of the pilot current is reduced, thus decreasing the wear to anode A.

In the preferred embodiment, resistor 116 has a value of 3 ohms and resistor 118 has a value of 15 ohms. However, other values of resistance may be selected to achieve the goals of increasing the consumable life of torch 10, while also providing for minimal delays due to pilot and cutting arc outages. The relative resistances determine the ratio of reduced to full pilot current. The preferred embodiment provides for a 5:1 resistance ratio, while a 20:1 or 150:1 ratio are used in other embodiments.

While the embodiments illustrated in the FIGS. 1 and 2 and described above are presently preferred, it should be understood that these embodiments are offered by way of example only. The invention is not intended to be limited to any particular embodiment, but is intended to extend to various modifications that nevertheless fall within the scope of the appended claims. For example, the pilot current control scheme described herein can be included in the pilot circuit of a HVHF type plasma cutting torch. In such a case, the pilot current control scheme would minimize the damage or interference to other electronics caused by the electromagnetic radiation from the HVHF switching. As further examples of alternative embodiments, sensing circuit 106 may comprise any type of conventional current sensing circuit, such as a current transformer, and control circuit 108 may comprise well known circuitry capable of controlling or regulating the magnitude of current flow. Of course, regardless of the type of current sensing or control schemes used, the pilot current control must be capable of responding quickly to detected changes in current flow in order to minimize delays associated with pilot and cutting arc outages, while also minimizing the detrimental effects to the consumable life of the plasma cutting torch and to other electronics.

The embodiments of the invention in which an exclusive property or privilege is claimed are defined as follows:

1. A method to control the pilot current in a plasma cutting torch, the plasma cutting torch having a power supply, a pilot arc, and a cutting arc for cutting a workpiece, the method comprising:

transferring a pilot arc to initiate a cutting arc;

sensing a cutting current indicative of the cutting arc; and controlling the magnitude of the pilot current in response to sensing the cutting current wherein a pilot non-zero current is maintained that has sufficient magnitude to establish the pilot arc in the event the cutting arc is extinguished.

2. The method of claim 1, wherein the step of controlling includes reducing the magnitude of the pilot current to a predetermined non-zero value in response to sensing the presence of the cutting current.

3. The method of claim 1, wherein the step of controlling includes increasing the magnitude of the pilot current to a predetermined value in response to sensing the absence of the cutting current.

4. The method of claim 2, wherein reducing the magnitude of the pilot current includes coupling an impedance in series with the pilot current path.

5. The method of claim 4, wherein coupling a resistance includes opening a switch coupled in parallel with the resistance.

6. The method of claim 3, wherein increasing the magnitude of pilot current includes shorting an impedance in series with the pilot current path.

7. The method of claim 6, wherein shorting an impedance includes closing a switch coupled in parallel with the resistance.

8. An apparatus to control the pilot current in a plasma cutting torch, the plasma cutting torch having a power supply, a pilot arc, and a cutting arc for cutting a workpiece, the apparatus comprising:

a pilot circuit coupled to the power supply, the pilot circuit maintaining a continuous flow of pilot current and generating the pilot arc, wherein the pilot arc is transferred to initiate the cutting arc;

a sensing circuit coupled to detect a cutting arc current, the sensing circuit having an output indicative of the cutting arc current; and a control circuit coupled to the pilot circuit and the sensing circuit, the control circuit controlling the magnitude of the pilot current in response to the sensing circuit output such that the pilot current is maintained at a magnitude non-zero sufficient to establish the pilot arc in the event the cutting arc is extinguished.

9. The apparatus of claim 8, wherein the control circuit reduces the magnitude of the pilot current to a predetermined value in response to the sensing circuit output indicating a presence of the cutting arc.

10. The apparatus of claim 8, wherein the control circuit increases the magnitude of the pilot current to a predetermined value in response to the sensing circuit output indicating an absence of the cutting arc.

11. The apparatus of claim 9, wherein the control circuit includes a switch to couple an impedance in series with the pilot current path.

12. The apparatus of claim 11, wherein the switch is an IGBT.

13. The apparatus of claim 10, wherein the control circuit includes a switch to short an impedance in series with the pilot current path.

14. The apparatus of claim 13, wherein the switch is a fast switch IGBT.

15. An apparatus for controlling the pilot current in a plasma cutting torch, the plasma cutting torch having a power supply means, a pilot arc, and a cutting arc for cutting a workpiece, the apparatus comprising:

pilot means coupled to the power supply means for maintaining a continuous flow of pilot current and for generating the pilot arc;

cutting arc means coupled to the pilot means for transferring the pilot arc to initiate the cutting arc;

sensing means for sensing a cutting arc current and for providing an output indicative of the cutting arc current; and control means coupled to the sensing means and the pilot means for controlling the magnitude of the pilot current in response to the sensing means output such that the pilot current is maintained at a non-zero magnitude sufficient to establish the pilot arc in the event the cutting arc is extinguished.

16. The apparatus of claim 15, wherein the control means includes switch means for reducing the magnitude of the pilot current to a predetermined non-zero value in response to the sensing means output indicating a presence of the cutting arc current.

17. The apparatus of claim 15, wherein the control means includes switch means for increasing the magnitude of the pilot current to a predetermined value in response to the sensing means output indicating an absence of the cutting arc current.

18. A pilot arc circuit having an electrode, an anode, and a flow of pilot arc current for initiating a pilot arc between the electrode and the anode, the pilot arc circuit comprising:

a sensing circuit, wherein the sensing circuit detects a condition of the arc and provides an output indicative of the condition of the arc; and a current control circuit coupled to the sensing circuit, wherein the current control circuit maintains a continuous non-zero flow of the pilot arc current and regulates the magnitude of the pilot arc current in response to the sensing circuit output, such that a pilot non-zero current is maintained that is sufficient to establish the pilot arc in the event that the cutting arc is extinguished.

19. The pilot arc circuit of claim 18, further comprising a first impedance that determines a first magnitude of the continuous flow of pilot arc current in response to the sensing circuit output indicating a first condition of the arc, and a second impedance that determines in series combination with the first impedance a second magnitude of the continuous flow of pilot arc current in response to the sensing circuit output indicating a second condition of the arc.

20. The pilot arc circuit of claim 19, wherein the current control circuit further comprises a switch coupled in parallel with the second impedance.

21. The pilot arc circuit of claim 20, wherein the switch is an IGBT.

22. A plasma cutter for providing a cutting current comprising:

a power supply;

a first electrode connected to the power supply;

a second electrode; and a pilot arc circuit disposed between the power supply and the second electrode, wherein the pilot arc circuit includes a first resistor in parallel with a fast switch.

23. The apparatus of claim 22, wherein the fast switch is an electronic switch.

24. The apparatus of claim 23, further including a control circuit, wherein the control circuit closes the switch when the cutting current falls below a predetermined threshold.

25. The apparatus of claim 23, further including a control circuit, wherein the control circuit opens the switch when the cutting current rises above a second a predetermined threshold.

26. The apparatus of claim 22, wherein the switch is an IGBT.

27. The apparatus of claim 22, wherein the pilot arc current circuit includes a second resistor having a second resistance in series with the parallel combination, and wherein the first resistor has a resistance of no more than about 150 times the second resistance.

28. The apparatus of claim 22, wherein the pilot arc current circuit includes a second resistor having a second resistance in series with the parallel combination, and wherein the first resistor has a resistance of no more than about 20 times the second resistance.

29. A plasma cutter for providing a cutting current comprising:

a power supply;

a first electrode connected to the power supply;

a second electrode; and a pilot arc circuit disposed between the power supply and the second electrode, wherein the pilot arc circuit includes a first resistor having a first resistance in parallel with a switch, and a second resistor having a second resistance in series with the parallel combination, and wherein the first resistance is no more than about 150 times the second resistance.

30. The apparatus of claim 29, wherein the switch is a fast switch.

31. The apparatus of claim 30, further including a control circuit, wherein the control circuit closes the switch when the cutting current falls below a predetermined threshold.

32. The apparatus of claim 31, further including a control circuit, wherein the control circuit opens the switch when the cutting current rises above a second a predetermined threshold.

33. The apparatus of claim 32, wherein the switch is an IGBT.

* * * * *